(12) United States Patent
Knebel et al.

(10) Patent No.: US 11,156,632 B2
(45) Date of Patent: Oct. 26, 2021

(54) MEASURING DEVICE FOR A SCANNING PROBE MICROSCOPE AND METHOD FOR SCANNING PROBE MICROSCOPY OF A MEASUREMENT SAMPLE BY MEANS OF A SCANNING PROBE MICROSCOPE

(71) Applicant: Bruker Nano GmbH, Berlin (DE)

(72) Inventors: Detlef Knebel, Berlin (DE); Tilo Jankowski, Berlin (DE); Frederik Büchau, Berlin (DE)

(73) Assignee: Bruker Nano GmbH, Berlin (DE)

( * ) Notice: Subject to any disclaimer, the term of this patent is extended or adjusted under 35 U.S.C. 154(b) by 0 days.

(21) Appl. No.: 16/903,672

(22) Filed: Jun. 17, 2020

(65) Prior Publication Data
US 2020/0400715 A1 Dec. 24, 2020

(30) Foreign Application Priority Data
Jun. 18, 2019 (DE) .................... 10 2019 116 471.0

(51) Int. Cl.
*G01Q 10/04* (2010.01)
*G01Q 10/06* (2010.01)

(52) U.S. Cl.
CPC ......... *G01Q 10/045* (2013.01); *G01Q 10/065* (2013.01)

(58) Field of Classification Search
CPC ........ G01Q 10/00; G01Q 10/02; G01Q 10/04; G01Q 10/045; G01Q 10/06; G01Q 10/065; G01Q 20/00; G01Q 20/02; G01Q 20/04; G01Q 70/00; G01Q 70/02
USPC ........................ 850/1, 2, 3, 4, 5, 6, 7, 52, 53
See application file for complete search history.

(56) References Cited

U.S. PATENT DOCUMENTS

| | | | |
|---|---|---|---|
| 6,038,916 A * | 3/2000 | Cleveland .............. | G01Q 60/34 73/105 |
| 7,249,002 B1 | 7/2007 | Ben-Dov et al. | |
| 2004/0051542 A1* | 3/2004 | Miles ..................... | B82Y 35/00 250/234 |
| 2009/0276176 A1* | 11/2009 | Schulze ............... | G01N 27/002 702/85 |
| 2012/0319679 A1* | 12/2012 | Heike .................... | B82Y 35/00 324/207.13 |

FOREIGN PATENT DOCUMENTS

| | | |
|---|---|---|
| DE | 197 54 681 A1 | 6/1999 |
| DE | 198 16 914 B4 | 2/2011 |

* cited by examiner

*Primary Examiner* — Nicole M Ippolito
(74) *Attorney, Agent, or Firm* — Boyle Fredrickson S.C.

(57) ABSTRACT

A measuring device for a scanning probe microscope including a sample receptacle configured to receive a sample; a measuring probe which is arranged on a probe holder and has a probe tip; a displacement device which moves the measuring probe and the sample receptacle relative to each other; a control device which is connected to the displacement device and controls the relative movement between the measuring probe and the sample receptacle; and a sensor device which is configured to detect, movement measurement signals during an absolute measurement for a movement of the measuring probe and/or a movement of the sample receptacle. The movement measurement signals are relayed to the control device. The control device is configured to control the relative movement. The invention also provides a scanning probe microscope, as well as a method for examining a sample.

13 Claims, 5 Drawing Sheets

MEASURING DEVICE FOR A SCANNING PROBE MICROSCOPE AND METHOD FOR SCANNING PROBE MICROSCOPY OF A MEASUREMENT SAMPLE BY MEANS OF A SCANNING PROBE MICROSCOPE

The invention relates to a measuring device for a scanning probe microscope, to a scanning probe microscope, and to a method for scanning probe microscopy of a measurement sample.

BACKGROUND

Scanning probe microscopes are known as such in various embodiments. They are used to examine measurement samples by scanning probe microscopy. To scan the measurement sample, a relative movement takes place between a probe tip of a measuring probe and a sample receptacle on which the measurement sample is arranged for the examination. The measuring probe and sample receptacle are moved relative to each other with the aid of a displacement device. The probe tip and the measurement sample interact. Measurement signals are detected from the interaction.

During the probe microscopy examination, the measurement sample is scanned in a raster pattern using the measuring probe. It must be ensured in this process that the raster scanning actually carried out by the measuring probe during the examination also corresponds to a raster pattern specified and planned for the measurement-based examination, so that the image of the measurement sample generated during the raster scanning is not distorted. In known scanning probe microscopes, problems can arise in this connection if the piezo elements used in the displacement device cause a non-linear movement. In addition, so-called creeps can also occur, leading to a situation where the measuring probe, which may be designed as a cantilever for example, and the measurement sample move relative to each other in addition to the scanning movement. Usually, the deflection between two components is measured by means of sensors, one of the components being moved by the displacement device and the other component not being moved. The measurement data evaluation regularly assumes that the connections between the displacement device (and its holder) and the location of the interaction between the measuring probe and the measurement sample are rigid. At higher scanning or sampling speeds (scanning frequency), this assumption is usually no longer applicable and therefore image distortions arise which can no longer be recognized by the sensor, and thus cannot be corrected.

DE 197 54 681 A1 discloses a device which scans in a scanning mode, in particular a scanning microscope. Compensation is provided for interference from mechanical oscillations on the scanning process. The device comprises a sensor for detecting mechanical oscillations, which controls a filter, the output of which is connected, together with the output of the device for generating a z-signal, to a summing unit, the output of which controls the device for changing the distance between the sample and the sensor.

U.S. Pat. No. 7,249,002 B1 discloses a device for analyzing a surface, and a method for compensating for mechanical oscillations and drift.

DE 198 16 914 B4 discloses an arrangement having a scanning microscope and an active anti-oscillation table in which oscillation with respect to an anti-oscillation table top is detected by an oscillation of the substrate by a displacement measuring device, an acceleration sensor or the like. An oscillation with an opposite phase with respect to this oscillation is transmitted to the anti-oscillation table top, thereby also reducing an external oscillation component from the background oscillation in the device.

SUMMARY

The object of the invention is to provide a measuring device for a scanning probe microscope, a scanning probe microscope, and a method for scanning probe microscopy of a measurement sample by means of a scanning probe microscope, wherein the aforementioned measurement problems are reduced or avoided entirely.

As a solution, a measuring device for a scanning probe microscope is provided according to independent claim 1. Furthermore, a scanning probe microscope and a method for scanning probe microscopy of a measurement sample by means of a scanning probe microscope are provided according to independent claims 12 and 13. Embodiments are the subject matter of dependent claims.

According to an aspect, a measuring device for a scanning probe microscope is provided which comprises the following: a sample receptacle which is configured to receive a measurement sample to be examined; a measuring probe which is arranged on a probe holder and has a probe tip with which the measurement sample may be measured; a displacement device which is configured to move the measuring probe and the sample receptacle relative to each other to measure the measurement sample, such that the measuring probe performs a raster movement relative to the measurement sample in at least one spatial direction; a control device which is connected to the displacement device and controls the relative movement between the measuring probe and the sample receptacle; and a sensor device which is configured to detect, during the relative movement between the measuring probe and the sample receptacle, movement measurement signals during an absolute measurement for a movement of the measuring probe and/or a movement of the sample receptacle, said absolute measurement being performed during the relative movement between the measuring probe and the sample receptacle, and to relay the movement measurement signals to the control device. The control device is also configured to control the relative movement between the measuring probe and the sample receptacle as a function of the movement measurement signals.

According to a further aspect, a scanning probe microscope comprising the measuring device is provided.

According to another aspect, a method is provided for scanning probe microscopy of a measurement sample by means of a scanning probe microscope, the method comprising the following steps: arranging a measurement sample on a sample receptacle of a scanning probe microscope; and examining by probe microscopy the measurement sample by means of a measuring probe which is arranged on a probe holder and has a probe tip. In this case, the measurement sample and the sample receptacle are moved relative to each other by means of a displacement device such that the measurement sample carries out a raster movement relative to the measurement sample in at least one spatial direction. A control device is provided which is connected to the displacement device and controls the relative movement between the measuring probe and the sample receptacle. By means of a sensor device, during the relative movement between the measuring probe and the sample receptacle, movement measurement signals are detected during an absolute measurement for a movement of the measurement sample and/or a movement of the sample receptacle, said absolute measurement being carried out during the relative movement between the measuring probe and the sample receptacle. The movement measurement signals are relayed to the control device. The control device also controls the relative movement between the measuring probe and the sample receptacle as a function of the movement measurement signals.

By means of the sensor device, the movement actually executed during the measurement by the measuring probe and/or measurement sample which is arranged on the sample receptacle is detected by means of an absolute measurement in each case, and fed back to the control device, so that said control device can generate the control signals for the displacement device for the relative movement of the measuring probe and measurement sample as a function thereof. The movement measurement signals are thus detected while the measuring probe and sample receptacle are moved relative to each other to determine or measure the measurement sample. If the movement actually executed by the measuring probe and measurement sample during the scanning or sampling of the measurement sample deviates from the raster movement specified for the probe microscopy examination, this may be corrected in this way. It is hereby ensured in an improved manner that the relative movement between the measuring probe and the sample receptacle (scanning or determining the measurement sample) executed during the examination of the measurement sample corresponds to the movement planned and specified for the examination.

An absolute measurement in the sense of the present disclosure is a measurement of a physical quantity based on an inertial system, which means that the measurement is carried out without any reference points—i.e., in particular without any reference points on the measuring device, as well as in the vicinity of the measuring device—for example, a laboratory.

A raster movement (raster scanning) in the sense of the present disclosure is a relative movement between the measuring probe and the measurement sample in order to bring the measuring probe into interaction with an investigating region of the measurement sample. For example, a triangular movement may be executed in a direction lateral to the measurement sample, and a step function may be executed in the other lateral direction, such that a rectangular region of the measurement sample is scanned.

The sensor device may comprise a first acceleration sensor device which is configured, when measuring the measurement sample, to detect as a function of time first movement measurement signals for a movement of the measuring probe or sample receptacle moved to execute the relative movement between the measuring probe and the sample receptacle. Speed and distance information for the movement of the measuring probe or the sample receptacle may be derived by integration from the measurement signals that are provided by means of the acceleration sensor device. The first movement signals are recorded for a component of the measuring device which is moved by means of the displacement device during the measurement of the measurement sample and the relative movement executed for this purpose between the measuring probe and the sample receptacle.

The sensor device may comprise a second acceleration sensor device which is configured, when measuring the measurement sample, to detect as a function of time second movement measurement signals for a movement of the sample receptacle or measuring probe which is not moved by means of the displacement device to execute the relative movement between the measuring probe and the sample receptacle. In this way, movement information can also be recorded for the sample receptacle or the measuring probe. Such an additional and unintentional movement can occur, in particular at higher scanning or sampling speeds, for the component of the measuring device which is not specifically moved for measuring the measurement sample (to execute the relative movement between the measuring probe and the sample receptacle) and for which therefore an immobile rest position is assumed in the prior art. By means of integration, information about absolute values for the speed and the path of the movement may be derived from the acceleration signals.

The sensor device may be formed at least partially on the probe holder. On the probe holder, the sensor device may be arranged adjacent to the mounting of the measuring probe on the probe holder, in particular in the immediate vicinity thereof. The sensor device may be arranged on an outer surface of the probe holder. Alternatively, the sensor device may be integrated into a housing or a block of the probe holder. The sensor device may be part of the measuring probe.

The sensor device may be formed at least partially on the sample receptacle. In connection with the at least partial formation of the sensor device on the sample receptacle, the explanations given above in connection with the probe holder for design options apply accordingly.

The sensor device may be formed having a first sensor element on the probe holder and having a second sensor element, assigned to the first sensor element, on the sample receptacle. The signals for the first and second sensor elements result in a relative measurement for each spatial direction, without the need for complex alignment of the sensor elements. The first and the second sensor element can, for example, be arranged opposite each other.

The measuring probe may be formed with a cantilever.

The control device and the displacement device may be configured to execute the raster movement of the measuring probe relative to the measurement sample as a periodic movement in the at least one spatial direction during the measurement of the measurement sample. The execution of a sinusoidal or a triangular periodic movement in at least one spatial direction may be provided.

The control device and the displacement device may be configured to control the periodic movement of the measuring probe relative to the measurement sample with respect to an amplitude and/or a phase of the periodic movement as a function of the movement measurement signals during the measurement of the measurement sample. Based on the movement signals detected during the absolute measurement for the movement of the measuring probe and/or the movement of the sample receptacle, control signals are generated for controlling the oscillating movement for scanning the measurement sample.

The control device and the displacement device may be configured to execute the raster movement of the measuring probe relative to the measurement sample with an oscillation frequency of at least about 100 Hz during the measurement of the measurement sample. Oscillation frequencies up to about 1 kHz may be provided, or alternatively up to about 20 kHz. It was surprisingly found that the measurement accuracy suffers at oscillation frequencies of approximately 100 Hz—or even falsified measurement results were found. The reason for this is additional movements of the components or functional elements of the measuring device that may be caused, for example, by resonance oscillations. In particular, at such oscillation frequencies, improved measurement results may be achieved with the proposed technology. It was surprisingly found that the measurement accuracy suffers at oscillation frequencies of about 100 Hz—or even falsified measurements result. The reason for this is additional movements of the components or functional elements of the measuring device that may be caused, for example, by resonance oscillations. In particular, at such oscillation frequencies, improved measurement results may be achieved with the proposed technology.

A further sensor device may be provided, which is configured to detect further movement signals as part of a relative movement, in particular to measure slow movements (for example at scanning frequencies of less than a threshold frequency, for example <about 100 Hz) which are not subject to the problems described above, and optionally to be able to compensate for these without introducing possible disadvantages of an absolute measurement—such as high noise—with slow movements. This may be a relative movement in relation to the probe holder, for example relative to the stand component. The further sensor device may be formed, for example, on a stand component on which the displacement device is accommodated, and on the probe holder. The further sensor device can have a distance sensor device which is configured to detect a distance between the stand component and the probe holder which changes over time during measurement of the measurement sample as a result of the movement caused by the displacement device. The detection of the distance which changes over time provides a measure for the relative movement between the measuring probe and the sample receptacle that is executed during the scanning probe microscopy examination of the measurement sample. The distance sensor device may be formed, for example, with one or more distance sensors that are assigned to each other on the stand component on the one hand, and on the displacement device on the other hand. The further sensor device can have, for example, a capacitive sensor, a strain gauge, a differential transformer, or another relative sensor.

The further sensor device may be used to control the relative movement between the measuring probe and the sample receptacle during the raster scanning of the measurement sample.

In the scanning probe microscope, the control device may be formed with an arrangement of functional components for signal processing and generation (control mechanism) which provide control signals for the displacement device.

Measurement signals which the further sensor device optionally detects may be evaluated by means of a first evaluation device, for example by converting measured capacitance (capacitive sensor) into a movement and relaying this to a processing mechanism. The further sensor device may be formed with a distance sensor. The first acceleration sensor may be evaluated by means of a second evaluation device in order to also relay signals to the processing mechanism. The processing mechanism combines the two signals from the first and the second evaluation device in a suitable manner and then relays them to a control mechanism which generates control signals in order to control the movement by means of the displacement device.

Various processing or control mechanisms may be selected. In the case of slow scanning speeds (rather low frequencies) up to a threshold value or limit frequency, for example at frequencies of less than about 100 Hz, the signal of the first evaluation device may be relayed unchanged to the control mechanism via the processing mechanism—i.e., without taking into account the movement measurement signals from the first acceleration sensor. Above a certain scanning speed (above the threshold value or limit frequency, for example above about 100 Hz), the signal of the second evaluation device may be relayed unchanged to the control mechanism via the processing mechanism—i.e., without taking into account the measurement signals from the further sensor device.

A further embodiment is that, starting from the threshold frequency, the output signal of the second evaluation device is used to correct the output signal of the first evaluation device. For a sinusoidal movement, for example, this correction may be such that the amplitude and/or the phase of the movement are precisely determined from the second evaluation device. This is possible, for example, by using a predetermined scanning frequency from the processing mechanism as a reference, for example for a lock-in amplifier, which then belongs to the second evaluation device.

It can also be provided that the signals from the further sensor device and the first acceleration sensor and/or the second acceleration sensor are calculated abstractly, so that algorithms that are used in the processing mechanism and in the control mechanism need not even refer to the actual relative movement between the probe tip and the measurement sample. A calibration can take place so that the signals allow correct movement in the control loop. The signals may be abstractly calibrated to each other by comparing both quantities at an uncritical, rather low, frequency (for example <100 Hz) or, even better, at several frequencies and then setting them to the same value.

The explanations given above in connection with the measuring device may be applied accordingly for the scanning probe microscope and/or the method for raster probe microscopy of the measurement sample by means of the scanning probe microscope.

BRIEF DESCRIPTION OF DRAWINGS

In the following, further embodiments are explained in more detail with reference to the drawings. In the drawings.

DETAILED DESCRIPTION OF EMBODIMENTS

Figure 1:
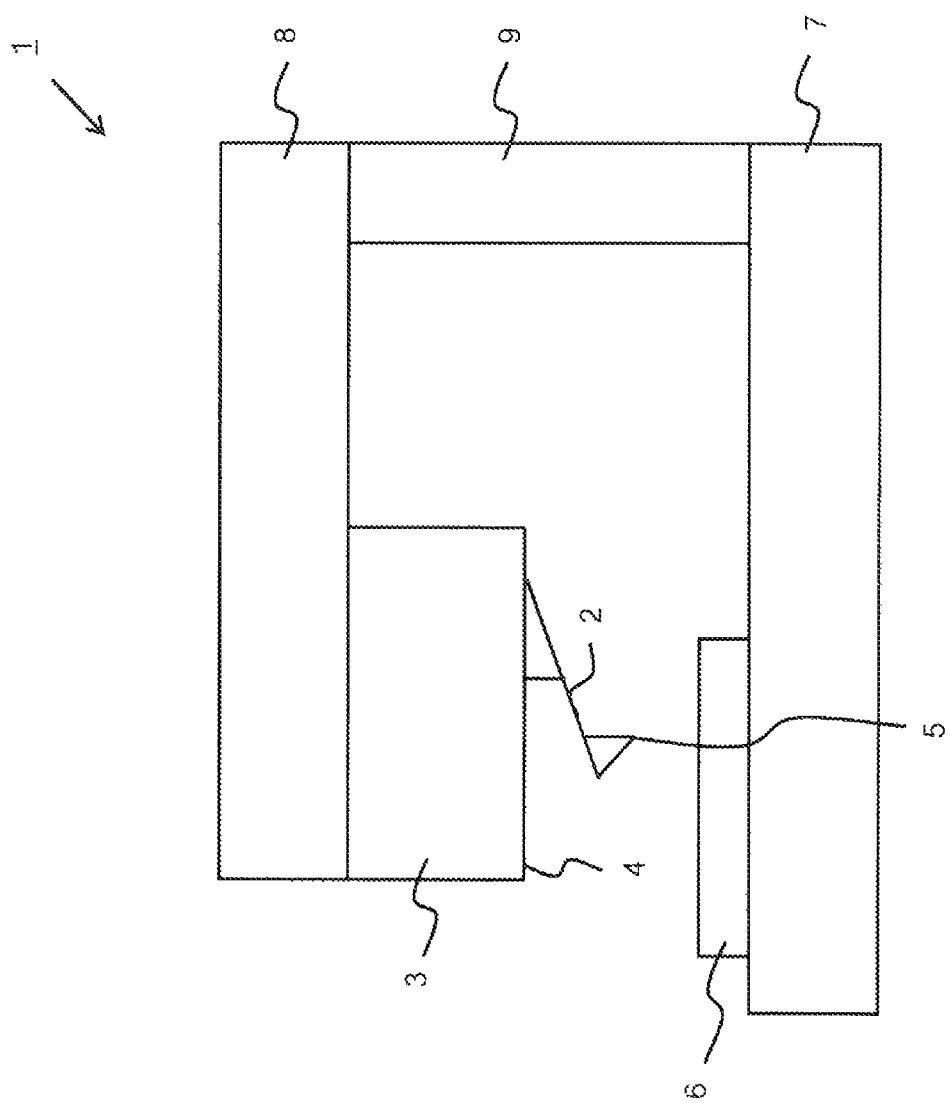
FIG. 1 is a schematic representation of a measuring device for a scanning probe microscope according to the prior art.

FIG. 1 is a schematic representation of a measuring device 1 for a scanning probe microscope. Scanning probe microscopes are known as such in various embodiments, for example also as atomic force microscopes (AFM). A measuring probe 2, which can also be called a near-field probe and which is, for example, a cantilever, is accommodated on a probe holder 3, specifically on an underside 4 of the probe holder 3. In scanning probe microscopy, the interaction of the measuring probe 2 with a measurement sample 6 is detected. The measurement sample 6 to be examined is scanned point-by-point in a raster process by means of this measuring probe 2. The measured values resulting for each individual point can then be combined to form a digital image.

For probe microscopy, a probe tip 5 of the measuring probe 2 is arranged opposite the measurement sample 6, which is arranged on a sample receptacle 7, optionally on a sample holder arranged thereon (not shown). With the aid of a displacement device 8, which is accommodated on a stand component 9, the probe holder 3 with the measuring probe 2 is moved relative to the sample receptacle 7 with the measurement sample 6 in order to scan (raster scan) the measurement sample 6. A so-called force detection is carried out, with which a measure for an interaction between the probe tip 5 and the measurement sample 6 is detected. In accordance with this interaction, the probe tip 5 is deflected, for example toward the measurement sample 6. This deflection of the probe tip 5 may be detected, for example, in accordance with the light pointer principle. Here, for example, a measuring light beam is directed onto a portion of the measuring probe 2 and reflected there in a known manner. The reflected light beam is then detected with a light-sensitive element, for example a photodiode. This measuring principle is known as such in various embodiments and therefore need not be explained further here.

Figure 2:
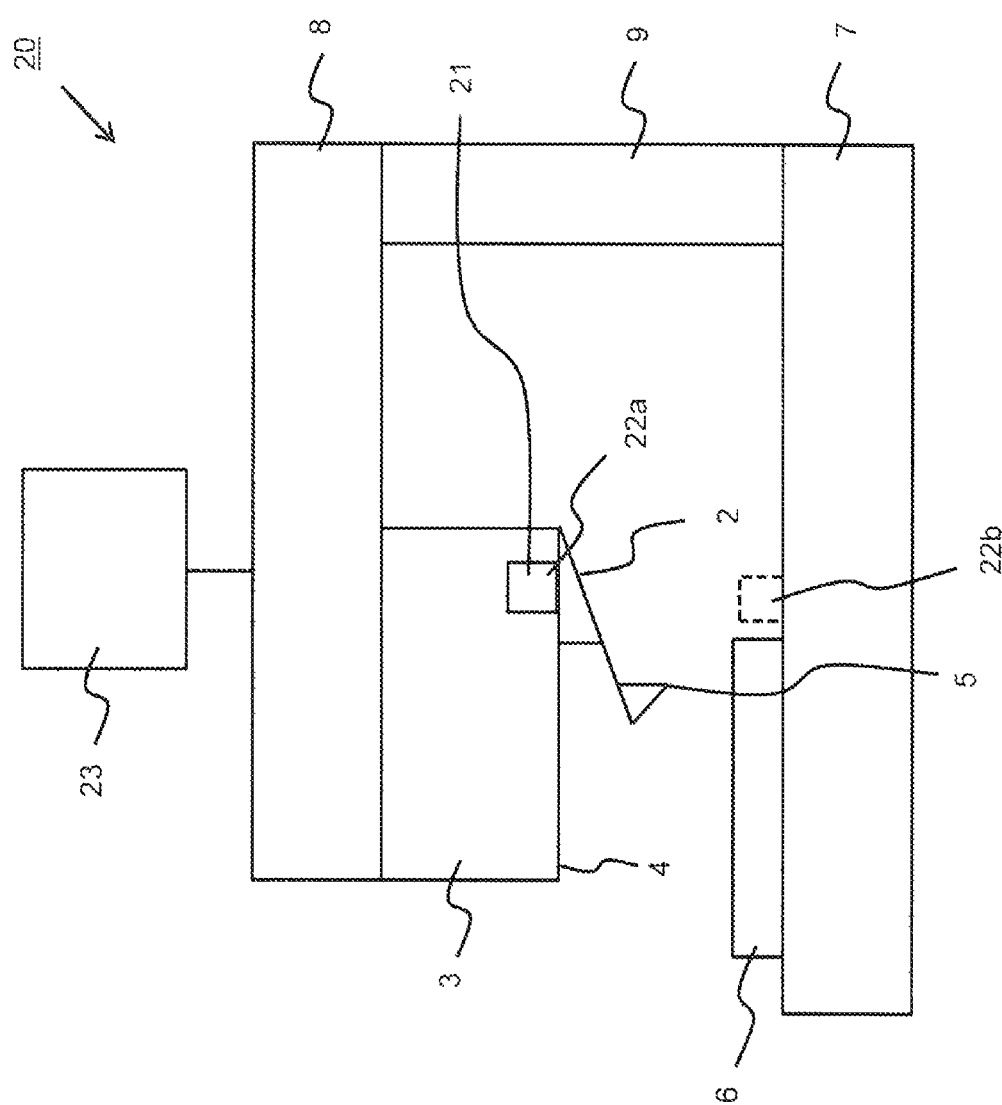
FIG. 2 is a schematic representation of a measuring device for a scanning probe microscope, having an acceleration sensor device.

FIG. 2 shows a schematic embodiment for a measuring device 20 which has a sensor device 21 with which it is possible, as part of an absolute measurement when examining the measurement sample 6 by scanning probe microscopy, to detect movement measurement signals for a movement of the measuring probe 2 on the probe holder 3 and/or the measurement sample 6 on the sample receptacle 7. For this purpose, the sensor device 21 is at least partially (directly) adjacent to the holder of the measuring probe 2 on the probe holder 3.

In the embodiment in FIG. 2, an acceleration sensor device 22 is provided in the sensor device 21, and is formed having a first and a second acceleration sensor 22a, 22b on the probe holder 3 and on the sample receptacle 7. Alternatively, only one sensor element (acceleration sensor) can also be provided, in particular on the probe holder 3, which is why the second acceleration sensor 22b is represented by a dashed line. By means of the acceleration sensor device 22, movement information for the relative movement between the measurement sample 6 and the sample receptacle 7 may be detected. Speed and distance information may be derived from this by integration of the movement measurement signals.

The movement measurement signals detected by means of the sensor device 21 are transmitted to a control device 23 which is connected to the displacement device 8. The movement measurement signals are evaluated in the control device 23 in order to generate, as a function thereof, control signals for the displacement device 8, which serve to move the measuring probe 2 and sample receptacle 7 relative to each other during measurement—specifically to scan the measurement sample 6.

The measurement signals recorded for the relative movement by means of the sensor device 21 may be taken into account as part of an adaptive control mechanism. For example, a control voltage may be specified for the displacement device 8. This is not changed as long as the recorded measurement signals indicate that the relative movement executed by the measuring probe 2 and sample receptacle 7 during operation corresponds to the planned and specified scanning of the measurement sample 6.

Figure 3:
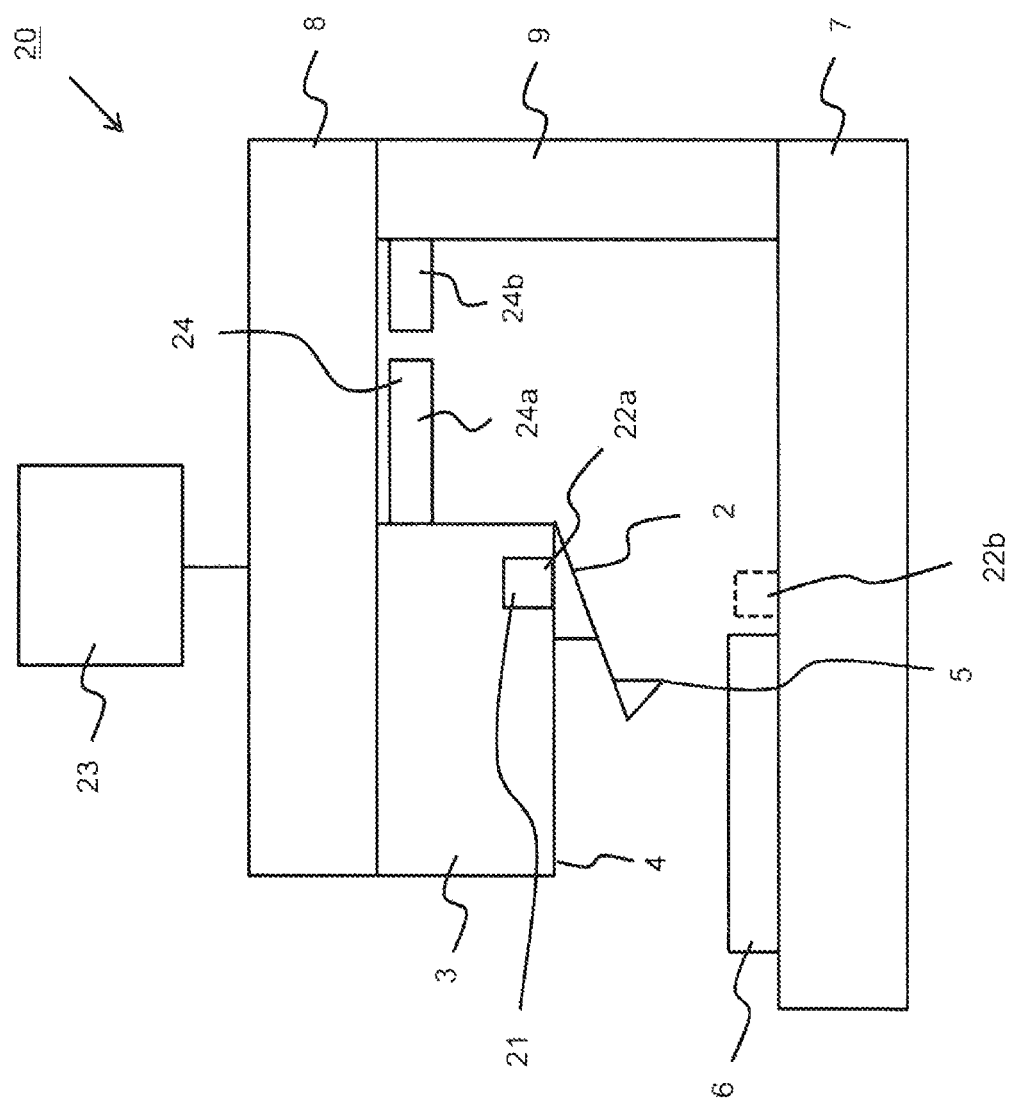
FIG. 3 is a schematic representation of a measuring device for a scanning probe microscope, having a further sensor device.

FIG. 3 is a schematic representation of a measuring device 20 for a scanning probe microscope, having a further sensor device 24 which may be designed as a distance sensor device and, in the embodiment shown, comprises sensor elements 24a, 24b which are assigned to each other and are arranged on the probe holder 3 and on the stand component 9. The further sensor device 24 makes it possible to detect an additional/disruptive movement of the probe holder 3 and/or the stand component 9 during measurement, in particular when the oscillation frequencies are slow, for example less than 100 Hz, or when a constant position is maintained, which may be necessary, for example, when force-distance curves are detected, or in external optical experiments, wherein a relative movement between the probe holder 3 and the stand component 9 may be determined.

The further sensor device 24 may be formed, for example, with capacitive sensor elements. The further sensor device 24 is configured to detect the movement of the probe holder 3 caused by the displacement device 8 in relation to the stand component 9. The mutually assigned sensor elements 24a, 24b are each arranged adjacent to the displacement device 8 in the embodiment shown, which is why the measurement signals detected by the further sensor device 24 may be processed or evaluated, for example, on the assumption that between the probe holder 3 and the stand component 9 there is a substantially rigid connection via the displacement device 8, such that the portion on the probe holder 3 on which the sensor element 24a is arranged exactly follows the movement path generated by the displacement device 8.

Figure 4:
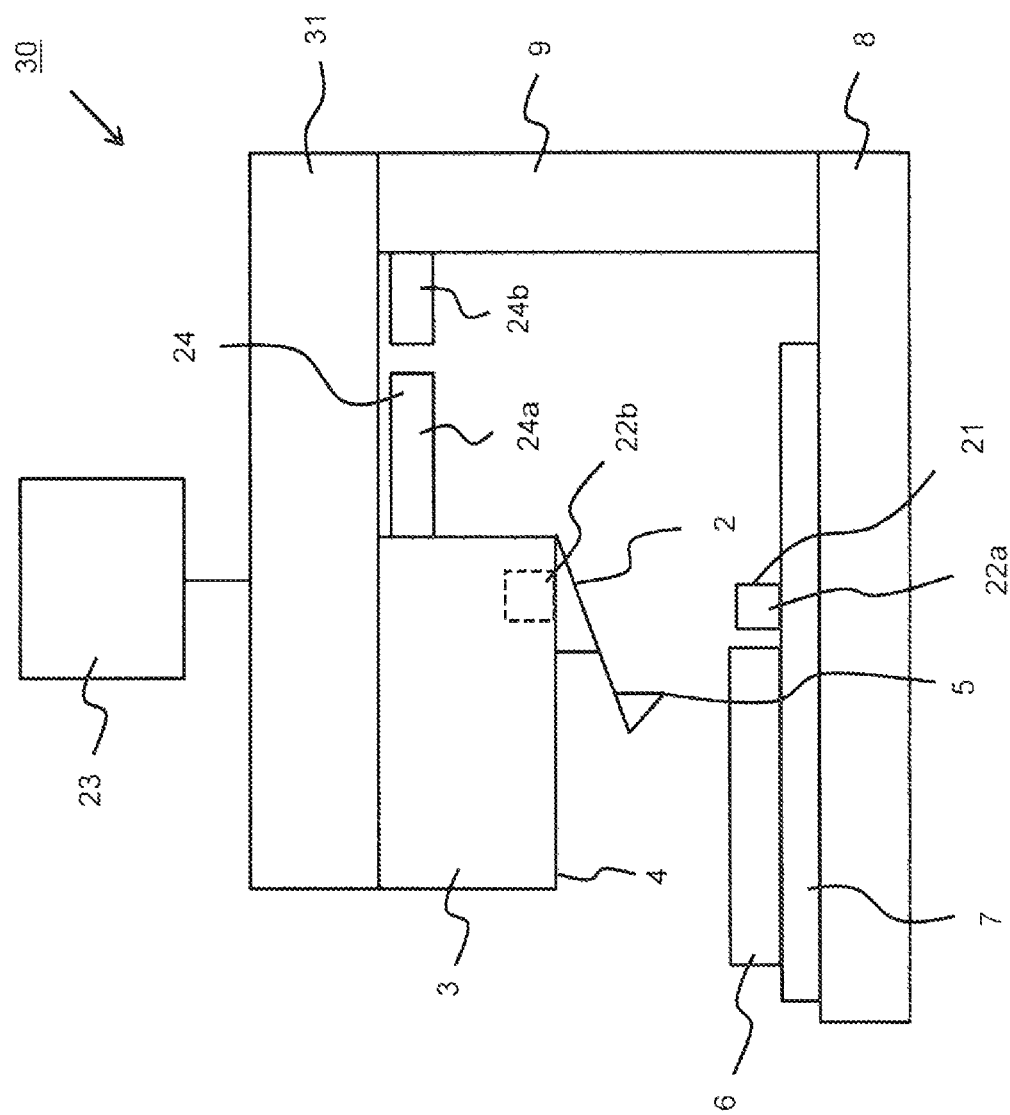
FIG. 4 is a schematic representation of a further measuring device for a scanning probe microscope.

FIG. 4 is a schematic representation of a further measuring device 30 for a scanning probe microscope. For the same features, the same reference numerals are used in FIG. 4 as in FIGS. 2 and 3. In contrast to the configurations in FIGS. 2 and 3, the sample receptacle 7 is displaceable by means of the displacement device 8 in order to execute the relative movement between the measuring probe 2 and the sample receptacle 7. The displacement device 8 may be designed as a so-called "stage"—i.e., a stationary part of the displacement device is fixed, for example, on a table, an inverted microscope or another test device, and a movable part displaces the sample receptacle 7. The sample holder 3 is accommodated on a carrier component 31. The first acceleration sensor 22a is arranged on the sample receptacle 7 and the second acceleration sensor 22b is arranged on the sample holder 3. A further sensor device for measuring slow movements between 7 and 9 can also be provided. This can then be part of the displacement device 8. The further sensor device 24 with the mutually assigned sensor elements 24a, 24b is optional and can also be omitted.

Figure 5:
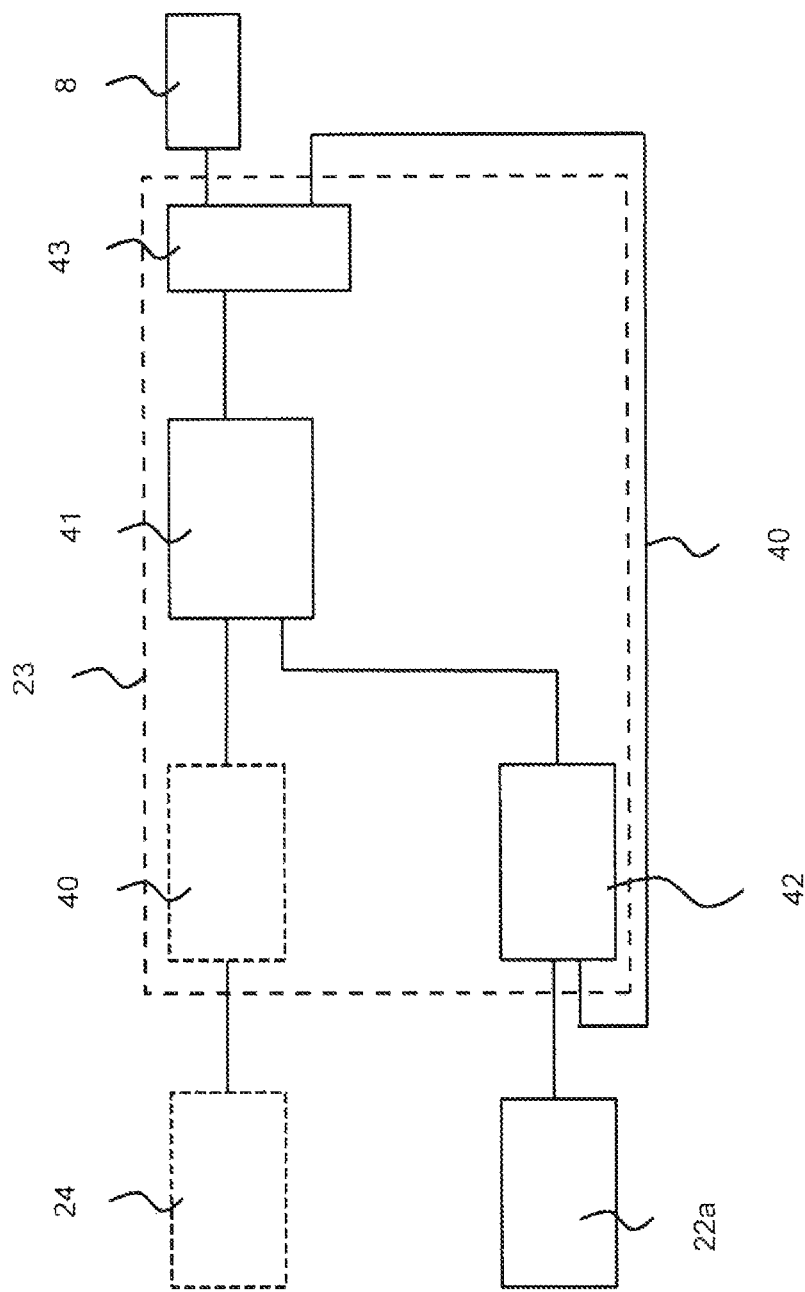
FIG. 5 is a schematic representation of an arrangement of functional components for signal processing and generation in a scanning probe microscope.

FIG. 5 is a schematic representation of an arrangement of functional components for signal processing and generation (control mechanism) in a scanning probe microscope. Measurement signals, which the further sensor device 24 optionally detects, are evaluated by means of a first evaluation device 40, for example by converting measured capacitance (capacitive sensor) into a movement and relaying this to a processing mechanism 41.

The first acceleration sensor 22a is evaluated by means of a second evaluation device 42 and also relayed to the processing mechanism 41. The processing mechanism 41 combines the two signals in a suitable manner and then passes them on to a control mechanism 43 which then generates control signals in order to control the movement by means of the displacement device 8.

Different processing mechanisms may be selected. For example, at slow scanning speeds (rather low frequencies), the signal of the first evaluation device 40 may be relayed to the control mechanism 43 unchanged via the processing mechanism 41—i.e., without taking into account the movement measurement signals from the first acceleration sensor 22*a*. Above a certain speed (frequency, for example above about 100 Hz), the signal of the second evaluation device 42 could be relayed to the control mechanism 43 unchanged via the processing mechanism 41—i.e., without taking into account the measurement signals from the further sensor device 24.

Another embodiment consists in that the output signal of the second evaluation device 42 is used to correct the output signal of the first evaluation device 40 above a threshold value frequency. For a sinusoidal movement, this correction can, for example, be such that the amplitude and the phase of the movement are determined very precisely from the second evaluation device 42. This is possible, for example, by using a prespecified scanning frequency from the processing mechanism 41 as a reference, for example for a lock-in amplifier (not shown), which then belongs to second evaluation device 42.

It can also be provided that the signals from the further sensor device 24 and the first acceleration sensor 22*a* and/or the second acceleration sensor 22*b* are calculated abstractly, so that algorithms used in the processing mechanism 41 and control mechanism 43 do not refer to the actual relative movement at all between the probe tip 5 and measurement sample 6. A calibration can take place so that the signals allow correct movement in the control loop. The signals may be abstractly calibrated to each other by comparing both quantities at an uncritical, rather low, frequency (for example <100 Hz) or, even better, at several frequencies and then setting them to the same value.

The features disclosed in the above description, the claims and the drawings may be relevant to implementing the different embodiments either individually or in any combination.

The invention claimed is:

1. A measuring device for a scanning probe microscope, comprising
   a sample receptacle which is configured to receive a measurement sample (6) to be examined;
   a measuring probe which is arranged on a probe holder and which has a probe tip with which the measurement sample can be measured;
   a displacement device which is configured to move the measuring probe and the sample receptacle relative to each other, to measure the measurement sample, in a such a manner that the measuring probe executes a raster movement relative to the measurement sample in at least one spatial direction;
   a control device which is connected to the displacement device and which controls the relative movement between the measuring probe and the sample receptacle; and
   a sensor device which is configured to detect, during the relative movement between the measuring probe and the sample receptacle, movement measurement signals as part of an absolute measurement for a movement of the measuring probe and/or a movement of the sample receptacle, said absolute measurement being performed during the relative movement between the measuring probe and the sample receptacle, and to relay the movement measurement signals to the control device;
   wherein the control device is further configured to control the relative movement between the measuring probe and the sample receptacle as a function of the movement measurement signals.

2. The measuring device according to claim 1, wherein the sensor device has a first acceleration sensor device which is configured, when measuring the measurement sample, to detect as a function of time first movement measurement signals for a movement of the measuring probe or sample receptacle moved to execute the relative movement between the measuring probe and the sample receptacle.

3. The measuring device according to claim 1, wherein the sensor device has a second acceleration sensor device which is configured, when measuring the measurement sample, to detect as a function of time second movement measurement signals for a movement of the sample receptacle or measuring probe which is not moved by means of the displacement device to execute the relative movement between the measuring probe and the sample receptacle.

4. The measuring device according to claim 1, wherein the sensor device is at least partially formed on the probe holder.

5. The measuring device according to claim 1, wherein the sensor device is at least partially formed on the sample receptacle.

6. The measuring device according to claim 5, wherein the sensor device is at least partially formed on the probe holder, and wherein the sensor device is formed with a first sensor element on the probe holder and a second sensor element, assigned to the first sensor element, on the sample receptacle.

7. The measuring device according to claim 1, wherein the measuring probe is formed with a cantilever.

8. The measuring device according to claim 1, wherein the control device and the displacement device are configured to execute the raster movement of the measuring probe relative to the measurement sample as a periodic movement in the at least one spatial direction during the measurement of the measurement sample.

9. The measuring device according to claim 8, wherein the control device and the displacement device are configured to control the periodic movement of the measuring probe relative to the measurement sample during the measurement of the measurement sample, with respect to an amplitude and/or a phase of the periodic movement, as a function of the movement measurement signals.

10. The measuring device according to claim 1, wherein the control device and the displacement device are configured to measure the raster movement of the measuring probe relative to the measurement sample during the measurement of the measurement sample with an oscillation frequency of at least approximately 100 Hz.

11. The measuring device according to claim 1, wherein a further sensor device is provided, which is configured to detect further movement signals during a relative movement.

12. A scanning probe microscope for scanning probe microscopic examination of a measurement sample, having a measuring device according to claim 1.

13. A method for scanning probe microscopic examination of a measurement sample by means of a scanning probe microscope, comprising the steps of:
    arranging a measurement sample on a sample receptacle of a scanning probe microscope; and
    examining by probe microscopy the measurement sample by means of a measurement probe which is arranged on a probe holder and has a probe tip;
Wherein,
    the measuring probe and the sample receptacle are moved relative to each other by means of a displacement device in such a manner that the measuring probe executes a raster movement relative to the measurement sample in at least one spatial direction;

a control device, which is connected to the displacement device, controls the relative movement between the measuring probe and the sample receptacle;

by means of a sensor device, during the relative movement between the measuring probe and the sample receptacle, movement measurement signals are detected during an absolute measurement for a movement of the measuring probe and/or a movement of the sample receptacle, said absolute measurement being carried out during the relative movement between the measuring probe and the sample receptacle;

the movement measurement signals are relayed to the control device; and the control device further controls the relative movement between the measuring probe and the sample receptacle as a function of the movement measurement signals.

* * * * *